US008654547B2

(12) United States Patent
Djenguerian et al.

(10) Patent No.: US 8,654,547 B2
(45) Date of Patent: *Feb. 18, 2014

(54) METHOD AND APPARATUS FOR DIGITAL CONTROL OF A SWITCHING REGULATOR

(75) Inventors: Alex B. Djenguerian, Saratoga, CA (US); Andrew J. Morrish, Saratoga, CA (US); Arthur B. Odell, Cupertino, CA (US); Kent Wong, Fremont, CA (US)

(73) Assignee: Power Integrations, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/466,780

(22) Filed: May 8, 2012

(65) Prior Publication Data

US 2012/0218788 A1 Aug. 30, 2012

Related U.S. Application Data

(63) Continuation of application No. 12/899,405, filed on Oct. 6, 2010, now Pat. No. 8,194,422, which is a continuation of application No. 12/796,592, filed on Jun. 8, 2010, now Pat. No. 7,830,678, which is a continuation of application No. 11/804,173, filed on May 15, 2007, now Pat. No. 7,755,917, which is a continuation of application No. 11/213,296, filed on Aug. 26, 2005, now Pat. No. 7,233,504.

(51) Int. Cl.
*H02M 3/335* (2006.01)

(52) U.S. Cl.
USPC ........................................ 363/21.13

(58) Field of Classification Search
USPC ................. 363/21.13, 21.05; 323/284
See application file for complete search history.

(56) References Cited

U.S. PATENT DOCUMENTS 3,491,252 A 1/1970 Petrohilos
3,555,399 A 1/1971 Buchanan et al.
(Continued)

FOREIGN PATENT DOCUMENTS

CN 1016920 B 6/1992
EP 0 651 440 A1 5/1995
(Continued)

OTHER PUBLICATIONS

"TinySwitch Family", Power Integrations, Inc., TNY253/254/255, product information, Jun. 1998, pp. 1-16.
(Continued)

*Primary Examiner* — Harry Behm
(74) *Attorney, Agent, or Firm* — Blakely Sokoloff Taylor & Zafman LLP

(57) ABSTRACT

In one aspect, a power supply includes an energy transfer element, a switch, a feedback circuit, a comparator, a state machine, and a control circuit. The feedback circuit generates a feedback signal representative of an output level of the power supply. The comparator provides a feedback state signal having a first feedback state that represents the output level of the power supply being above a threshold level and a second feedback state that represents the output level being below the threshold level. The state machine selectively modulates a first signal in response to the feedback state signal, where the first signal is the feedback signal or the threshold value signal. The control circuit is coupled to control switching of the switch to regulate the output level of the power supply in response to the feedback state signal.

19 Claims, 12 Drawing Sheets

(56) References Cited

U.S. PATENT DOCUMENTS

| | | |
|---|---|---|
| 3,629,622 A | 12/1971 | Denenberg, Jr. |
| 3,840,797 A | 10/1974 | Aggen et al. |
| 3,916,224 A | 10/1975 | Daniels et al. |
| 3,978,393 A | 8/1976 | Wisner et al. |
| 4,058,758 A | 11/1977 | Peterson |
| 4,072,965 A | 2/1978 | Kondo |
| 4,143,282 A | 3/1979 | Berard, Jr. et al. |
| 4,151,387 A | 4/1979 | Peters, Jr. |
| 4,228,493 A | 10/1980 | de Sartre et al. |
| 4,236,198 A | 11/1980 | Ohsawa et al. |
| 4,353,113 A | 10/1982 | Billings |
| 4,378,585 A | 3/1983 | Bete |
| 4,400,767 A | 8/1983 | Fenter |
| 4,481,564 A | 11/1984 | Balaban |
| 4,495,554 A | 1/1985 | Simi et al. |
| 4,533,986 A | 8/1985 | Jones |
| 4,559,590 A | 12/1985 | Davidson |
| 4,573,112 A | 2/1986 | Numata et al. |
| 4,622,627 A | 11/1986 | Rodriguez et al. |
| 4,695,742 A | 9/1987 | Randall |
| 4,695,936 A | 9/1987 | Whittle |
| 4,706,176 A | 11/1987 | Kettschau |
| 4,706,177 A | 11/1987 | Josephson |
| 4,720,641 A | 1/1988 | Faini |
| 4,725,769 A | 2/1988 | Cini et al. |
| 4,734,839 A | 3/1988 | Barthold |
| 4,737,898 A | 4/1988 | Banfalvi |
| 4,739,462 A | 4/1988 | Farnsworth et al. |
| 4,761,724 A | 8/1988 | Brown et al. |
| 4,791,544 A | 12/1988 | Gautherin et al. |
| 4,800,323 A | 1/1989 | Sikora |
| 4,806,844 A | 2/1989 | Claydon et al. |
| 4,809,148 A | 2/1989 | Barn |
| 4,811,184 A | 3/1989 | Koninsky et al. |
| 4,814,674 A | 3/1989 | Hrassky |
| 4,858,094 A | 8/1989 | Barlage |
| 4,862,339 A | 8/1989 | Inou et al. |
| 4,866,590 A | 9/1989 | Odaka et al. |
| 4,870,555 A | 9/1989 | White |
| 4,887,199 A | 12/1989 | Whittle |
| 4,888,497 A | 12/1989 | Dallabora et al. |
| 4,890,210 A | 12/1989 | Myers |
| 4,928,220 A | 5/1990 | White |
| 4,937,728 A | 6/1990 | Leonardi |
| 4,942,508 A | 7/1990 | Nakamura |
| 4,943,761 A | 7/1990 | Fox et al. |
| 4,943,903 A | 7/1990 | Cardwell, Jr. |
| 5,012,399 A | 4/1991 | Takemura et al. |
| 5,012,401 A | 4/1991 | Barlage |
| 5,013,998 A | 5/1991 | Varga et al. |
| 5,014,178 A | 5/1991 | Balakrishnan |
| 5,018,058 A | 5/1991 | Ionescu et al. |
| 5,034,871 A | 7/1991 | Okamoto et al. |
| 5,041,956 A | 8/1991 | Marinus |
| 5,063,491 A | 11/1991 | Shigeo |
| 5,072,353 A | 12/1991 | Feldtkeller |
| 5,086,364 A | 2/1992 | Leipold et al. |
| 5,140,513 A | 8/1992 | Yokoyama |
| 5,146,394 A | 9/1992 | Ishii et al. |
| 5,161,098 A | 11/1992 | Balakrishnan |
| 5,177,408 A | 1/1993 | Marques |
| 5,184,290 A | 2/1993 | Ozawa et al. |
| 5,200,886 A | 4/1993 | Schwarz et al. |
| 5,260,861 A | 11/1993 | Wert |
| 5,289,101 A | 2/1994 | Furuta et al. |
| 5,297,014 A | 3/1994 | Saito et al. |
| 5,302,889 A | 4/1994 | Marsh |
| 5,309,078 A | 5/1994 | Cameron |
| 5,313,381 A | 5/1994 | Balakrishnan |
| 5,321,349 A | 6/1994 | Chang |
| 5,333,104 A | 7/1994 | Tamura et al. |
| 5,394,017 A | 2/1995 | Catano et al. |
| 5,408,173 A | 4/1995 | Knapp |
| 5,414,340 A | 5/1995 | Gannon |
| 5,434,768 A | 7/1995 | Jitaru et al. |
| 5,452,195 A | 9/1995 | Lehr et al. |
| 5,461,303 A | 10/1995 | Leman et al. |
| 5,475,579 A | 12/1995 | John et al. |
| 5,479,088 A | 12/1995 | Hayakawa et al. |
| 5,481,178 A | 1/1996 | Wilcox et al. |
| 5,488,552 A | 1/1996 | Sakamoto et al. |
| 5,508,602 A | 4/1996 | Borgato et al. |
| 5,513,089 A * | 4/1996 | Sudo et al. ............... 363/21.11 |
| 5,528,131 A | 6/1996 | Marty et al. |
| 5,552,746 A | 9/1996 | Danstrom |
| 5,563,534 A | 10/1996 | Rossi et al. |
| 5,568,084 A | 10/1996 | McClure et al. |
| 5,570,057 A | 10/1996 | Palara |
| 5,572,156 A | 11/1996 | Diazzi et al. |
| 5,610,803 A | 3/1997 | Malik |
| 5,617,016 A | 4/1997 | Borghi et al. |
| 5,619,403 A | 4/1997 | Ishikawa et al. |
| 5,621,629 A | 4/1997 | Hemminger et al. |
| 5,625,279 A | 4/1997 | Rice et al. |
| 5,631,810 A | 5/1997 | Takano |
| 5,636,109 A | 6/1997 | Carroll |
| 5,640,312 A | 6/1997 | Carroll |
| 5,640,317 A | 6/1997 | Lei |
| 5,675,485 A | 10/1997 | Seong |
| 5,710,697 A | 1/1998 | Cooke et al. |
| 5,729,448 A | 3/1998 | Haynie et al. |
| 5,786,990 A | 7/1998 | Marrero |
| 5,828,558 A | 10/1998 | Korcharz et al. |
| 5,844,790 A | 12/1998 | Jacobs et al. |
| 5,850,336 A | 12/1998 | Nakajima |
| 5,923,100 A | 7/1999 | Lukens et al. |
| 5,949,226 A | 9/1999 | Tanaka et al. |
| 5,966,004 A | 10/1999 | Kadanka |
| 6,049,471 A | 4/2000 | Korcharz et al. |
| 6,104,622 A | 8/2000 | Shin |
| 6,108,183 A | 8/2000 | Beene |
| 6,114,833 A | 9/2000 | Langston et al. |
| 6,198,261 B1 | 3/2001 | Schultz et al. |
| 6,208,533 B1 | 3/2001 | Ogawa |
| 6,226,190 B1 | 5/2001 | Balakrishnan et al. |
| 6,285,566 B1 | 9/2001 | Nakahira et al. |
| 6,297,623 B1 | 10/2001 | Balakrishnan et al. |
| 6,414,471 B1 | 7/2002 | Balakrishnan et al. |
| 6,525,514 B1 | 2/2003 | Balakrishnan et al. |
| 6,608,471 B2 | 8/2003 | Balakrishnan et al. |
| 6,667,605 B2 | 12/2003 | Balakrishnan et al. |
| 6,747,444 B2 | 6/2004 | Balakrishnan et al. |
| 6,784,646 B2 | 8/2004 | Balakrishnan et al. |
| 6,876,181 B1 | 4/2005 | Balakrishnan et al. |
| 6,894,911 B2 | 5/2005 | Telefus et al. |
| 6,900,622 B2 | 5/2005 | Balakrishnan et al. |
| 6,900,995 B2 | 5/2005 | Muegge et al. |
| 6,960,906 B2 * | 11/2005 | Yamashita ............... 323/285 |
| 6,972,970 B2 * | 12/2005 | Yamada ............... 363/21.16 |
| 6,980,442 B2 * | 12/2005 | Lv et al. ............... 363/21.1 |
| 7,038,439 B2 | 5/2006 | Balakrishnan et al. |
| 7,045,994 B2 | 5/2006 | Balakrishnan et al. |
| 7,202,650 B2 | 4/2007 | Lipcsei et al. |
| 7,211,991 B2 | 5/2007 | Balakrishnan et al. |
| 7,212,417 B2 * | 5/2007 | Fukumoto ............... 363/21.15 |
| 7,214,910 B2 | 5/2007 | Chen et al. |
| 7,248,029 B2 | 7/2007 | Balakrishnan et al. |
| 7,400,122 B2 | 7/2008 | Balakrishnan et al. |
| 7,477,534 B2 | 1/2009 | Balakrishnan et al. |
| 7,521,908 B2 | 4/2009 | Balakrishnan et al. |
| 7,538,535 B2 | 5/2009 | McDonald et al. |
| 7,701,186 B2 | 4/2010 | Balakrishnan et al. |
| 7,974,112 B2 | 7/2011 | Balakrishnan et al. |
| 2002/0027786 A1 | 3/2002 | Nakazawa et al. |
| 2002/0071295 A1 | 6/2002 | Nishikawa |
| 2004/0017182 A1 | 1/2004 | Balakrishnan et al. |
| 2004/0052448 A1 | 3/2004 | Griffin |
| 2004/0071244 A1 | 4/2004 | Shaeffer |
| 2004/0080962 A1 | 4/2004 | Charych |
| 2005/0124303 A1 | 6/2005 | Bengtson et al. |
| 2011/0228568 A1 | 9/2011 | Balakrishnan et al. |

(56) References Cited

U.S. PATENT DOCUMENTS

FOREIGN PATENT DOCUMENTS

| | | |
|---|---|---|
| EP | 0 694 966 A1 | 1/1996 |
| EP | 0 736 957 A1 | 10/1996 |
| EP | 0 740 491 A1 | 10/1996 |
| EP | 0 748 035 B1 | 12/1996 |
| EP | 0 751 621 B1 | 4/1998 |
| EP | 0 748 034 B1 | 2/2000 |
| EP | 0 875 983 A3 | 10/2000 |
| EP | 1179884 B1 | 2/2002 |
| JP | 02-262868 | 10/1990 |
| JP | 03-022862 | 1/1991 |
| JP | 03-050979 | 3/1991 |
| JP | 2000-217352 | 8/2000 |
| JP | 2002-095251 | 3/2002 |
| JP | 2002-176771 | 6/2002 |
| WO | WO 83/01157 | 3/1983 |

OTHER PUBLICATIONS

Hoffman, Jr. H.S., "Self-Generated Bias Supply", IBM Technical Disclosure Bulletin, vol. 20, No. 5, Oct. 1977, pp. 1814-1815.
Hoffman, Jr. H.S. et al., "Proportional Drive Supply with Diversion Control", IBM Technical Disclosure Bulletin, vol. 21, No. 12, May 1979, pp. 4904-4905.
Halperin, A., "Primary Regulated Dual Power Supply", IBM Technical Disclosure Bulletin, vol. 21, No. 10, Mar. 1979, pp. 4299-4300.
Riezenman, M., "5-W DC-DC Converters Aim at Telecomm Applications", Electronic Design vol. 31, No. 15, Jul. 21, 1983, pp. 227.
"Combined Switch-Mode Power Amplifier and Supply", IBM Technical Disclosure Bulletin, vol. 28, No. 3, Aug. 1985, pp. 1193-1195.
Bruckner, R. et al., "Optimizing Converter Design and Performance Utilizing Micro Controller System Feedback and Control", Proceedings of Powercon 8, E-2, 1981, pp. 1-10.
Pelly, B. et al., "Power MOSFET's Take the Load Off Switching Supply Design", Electronic Design, Feb. 17, 1983, pp. 135-139.
Azzis, D. et al., "Flyback on Card Power Supply", IBM Technical Disclosure Bulletin, vol. 23, No. 4, Sep. 1980, pp. 1477-1478.
Bowen, A.J. et al., "Power Supply with Optical Isolator", IBM Technical Disclosure Bulletin, vol. 14, No. 11, Apr. 1972, pp. 3320.
"Off-Line Power Supply Control Technique Using a Single Transformer to Feed Back Three Control Signals", IBM Technical Disclosure Bulletin, vol. 32, No. 8A, Jan. 1990, pp. 272-274.
CN 200610125658.0—Second Office Action, issued Feb. 12, 2010, with English Translation (28 pages).
CN 200610125658.0—Third Office Action, issued Jul. 27, 2010, with English Translation (31 pages).
CN 200610125658.0—Rejection Decision, issued Feb. 23, 2011, with English Translation (31 pages).
CN 200610125658.0—Notification of Reexamination, issued Jul. 10, 2012, with English Translation (12 pages).
JP 2006-230371—Final Notice of Grounds of Rejection, mailed Jul. 31, 2012, with English Translation (6 pages).
CN 200610125658.0—Notification of Reexamination, issued May 17, 2013, with English Translation (9 pages).
CN 200610125658.0—Reexamination Decision, issued Aug. 26, 2013, with English Translation (32 pages).

* cited by examiner

METHOD AND APPARATUS FOR DIGITAL CONTROL OF A SWITCHING REGULATOR

REFERENCE TO PRIOR APPLICATION

This application is a continuation of U.S. application Ser. No. 12/899,405, filed Oct. 6, 2010, now pending, which is a continuation of U.S. application Ser. No. 12/796,592, filed Jun. 8, 2010, now U.S. Pat. No. 7,830,678, which is a continuation of Ser. No. 11/804,173, filed May 15, 2007, now U.S. Pat. No. 7,755,917, which is a continuation of U.S. application Ser. No. 11/213,296, filed Aug. 26, 2005, now U.S. Pat. No. 7,233,504. U.S. application Ser. No. 12/899,405 and U.S. Pat. Nos. 7,830,678, 7,755,917 and 7,233,504 are hereby incorporated by reference.

BACKGROUND

1. Technical Field

Embodiments of the invention relate generally to power supplies, and more specifically, to the regulation of power supply outputs.

2. Background Information

Electronic devices use regulated power to operate. Switched mode power supplies are commonly used due to their high efficiency and good output regulation to power many of today's electronic devices. In a known switched mode power supply, a low frequency (e.g. 50 or 60 Hz mains frequency), high voltage alternating current (AC) is converted to high frequency (e.g. 30 to 300 kHz) AC, using a switched mode power supply control circuit. This high frequency, high voltage AC is applied to a transformer to transform the voltage, usually to a lower voltage, and to provide safety isolation. The output of the transformer is rectified to provide a regulated DC output, which may be used to power an electronic device. The switched mode power supply control circuit usually provides output regulation by sensing the output and controlling it in a closed loop.

A switched mode power supply may include an integrated circuit switching regulator, which may include a power switch or transistor coupled to a primary winding of the transformer. Energy is transferred to a secondary winding of the transformer by turning on and off the power transistor in a manner controlled by the switching regulator to provide a clean and steady source of power at the DC output.

In a known switching regulator, such as for example an embodiment of one described in U.S. Pat. No. 6,226,190 of Power Integrations of San Jose, Calif., a feedback current is sampled from the output of the DC output of the power supply. When the feedback current is below a regulation threshold, the power switch is switched at a constant frequency. When the feedback current is above a regulation threshold, the switching regulator is disabled, resulting in a skipped cycle of the power switch. In so doing, a power supply that utilizes reduced number of components is possible enabling a cost effective power supply for low power solutions. The embodiments of the described power supply provide a power supply that can respond quickly to load transients without losing output regulation.

However, when a switching regulator skips cycles, as described above, the resulting frequency of operation of the switching regulator is reduced. Thus, the frequency of operation of the switching regulator is varied as cycles are skipped to regulate the DC output of the power supply, with the frequency decreasing as the load coupled to the DC output decreases. Generally, when the frequency of operation of power supplies of this type drops to frequencies within the audio frequency range, such as within 20 Hz to 20 kHz, the transformers of the power supplies may generate undesirable audio noise.

To address this issue, Power Integrations of San Jose, Calif., introduced power supply regulators, such as for example the embodiments described in U.S. Pat. No. 6,525,514 of Power Integrations of San Jose, Calif., which utilize on/off control and reduce audio noise at light loads by adjusting the current limit of the switching regulator. In one embodiment, a described switching regulator includes a state machine that adjusts the current limit of the switching regulator based on a pattern of feedback signal values from the output of the power supply for a preceding N cycles of the drive signal. The state machine adjusts the current limit lower at light loads such that cycles are not skipped to reduce the operating frequency of the switching regulator into the audio frequency range until the flux density through the transformer is sufficiently low to reduce the generation of audio noise.

BRIEF DESCRIPTION OF THE DRAWINGS

The present invention detailed illustrated by way of example and not limitation in the accompanying Figures.

DETAILED DESCRIPTION

Embodiments of a power supply regulator that may be utilized in a power supply are disclosed. In the following description, numerous specific details are set forth in order to provide a thorough understanding of the present invention. It will be apparent, however, to one having ordinary skill in the art that the specific detail need not be employed to practice the present invention. Well-known methods related to the implementation have not been described in detail in order to avoid obscuring the present invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
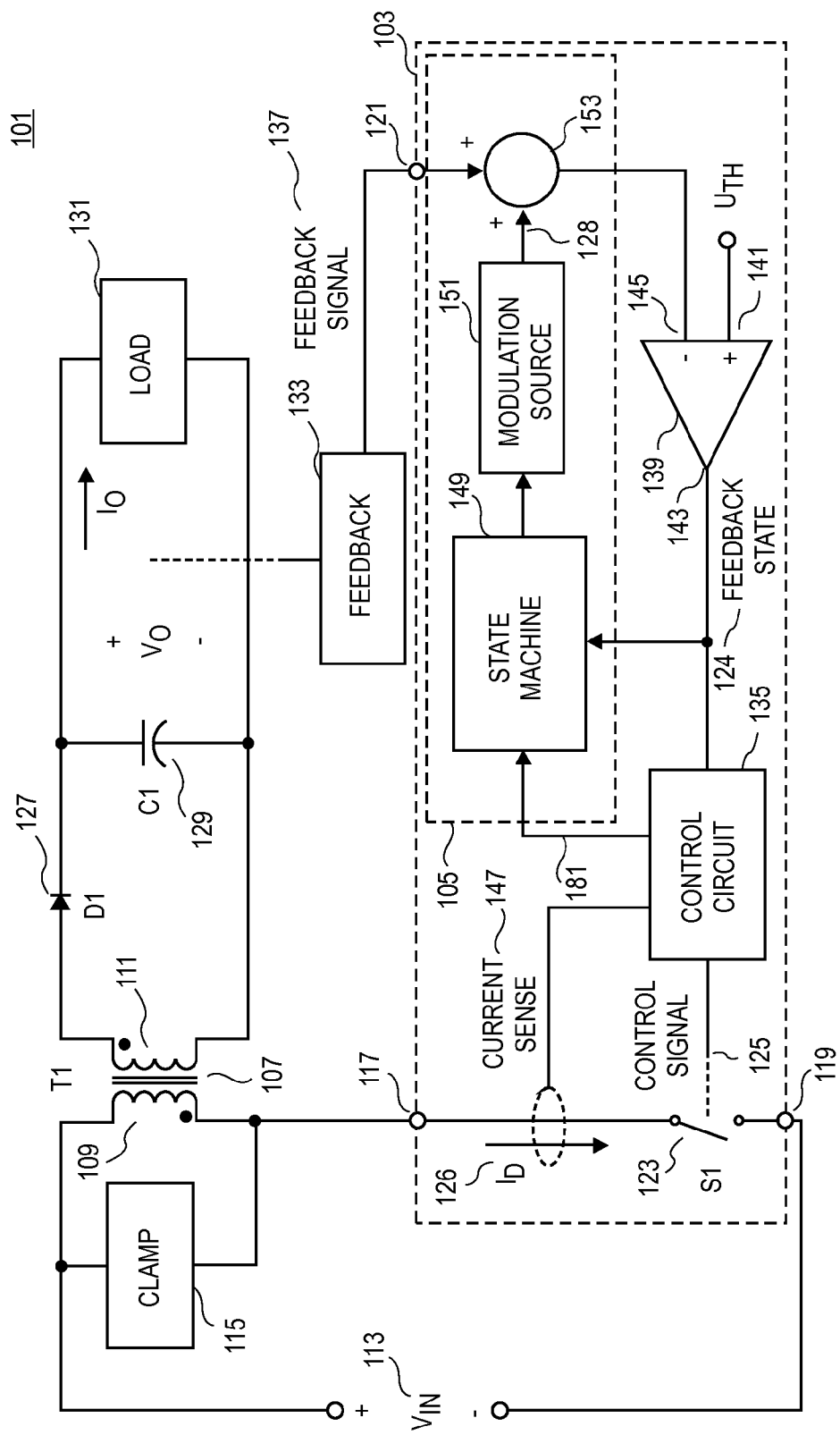
FIG. 1 is a block diagram illustrating an embodiment of a power supply including an embodiment of an adjustment circuit in a power supply regulator in accordance with the teachings of the present invention.

FIG. 1 is a block diagram illustrating an embodiment of a power supply 101 including an embodiment of an adjustment circuit 105 in a power supply regulator 103 in accordance with the teachings of the present invention. As shown, a voltage $V_{IN}$ 113 is coupled across an input of power supply 101 and is coupled to a primary winding 109 of an energy transfer element 107. In one embodiment, a clamp 115 is coupled across primary winding 109 to clamp the voltage across primary winding 109. In the illustrated embodiment, a first terminal 117 of power supply regulator 103 is coupled to energy transfer element 107 and a second terminal 119 is coupled to an input of power supply 101. In operation, a power switch 123 included in power supply regulator 103 is switched to couple or decouple the first terminal 117 from the second terminal 119 in response to a control signal 125, which is generated by a control circuit 135 of power supply regulator 103. In the illustrated embodiment, the switching of power switch 123 regulates the transfer of energy from primary winding 109 to a secondary winding 111 of energy transfer element 107. In the illustrated embodiment, diode 127 and capacitor 129 are coupled to secondary winding 111 at an output of power supply 101 such that a load 131 coupled to the output of power supply 101 is powered by receiving an output voltage $V_O$ and an output current $I_O$.

As shown in the illustrated embodiment, a feedback circuit 133 is coupled to the output of power supply 101 to generate a feedback signal 137, which is representative of an output level of power supply 101. For purposes of this disclosure, the output level of power supply 101 may be a voltage, a current or a combination of both voltage and current. In one embodiment, a third terminal 121 of power supply regulator 103 is coupled to receive feedback signal 137.

As shown in FIG. 1, power supply regulator 103 also includes one embodiment of a comparator 139 having an output 143 from which the results of a comparison between an input 141 and an input 145 are generated. In the illustrated embodiment, input 141 is coupled to receive a threshold value $U_{TH}$ and input 145 is coupled to be responsive to feedback signal 137. As will be discussed, in one embodiment, the threshold value $U_{TH}$ is a turnoff threshold value. In operation, the output 143 of comparator 139 is a feedback state signal 124, which in one embodiment functions as a digital on/off signal or an enable signal to control circuit 135. Thus, when the signal at input 145, which is representative of the output level of power supply 101, is greater than the threshold value $U_{TH}$, then the feedback state signal 124 at output 143 is a first state. However, when the signal at input 145 is less than the threshold value $U_{TH}$, then the feedback state signal 124 at output 143 is a second state. In one embodiment, one of the first and second states of the feedback state signal 124 is a logical high value and the other one of the first and second states of the feedback state signal 124 is a logical low value. The feedback state signal 124 is coupled to be received by control circuit 135, which helps to control the regulation of power supply 101. In one embodiment, control circuit 135 also includes a current limit circuit, which is coupled to receive a current sense signal 147 from power switch 123. In one embodiment, current sense signal 147 is representative of a current $I_D$ 126 through the power switch 123 and control circuit 135 also utilizes current sense signal 147 to help control the regulation of power supply 101.

In one embodiment, feedback signal 137 also indicates how much the output of power supply 101 is above or below a desired value by comparing the inputs 141 and 145 of comparator 139. If input 145 is less than the turnoff threshold $U_{TH}$, then the feedback state 124 at output 143 of comparator 139 is a digital high value, and the control circuit 135 is allowed to operate the power switch 123. If input 145 is greater than the turnoff threshold $U_{TH}$, then the feedback state 124 at output 143 of the comparator 139 is a digital low value, and the control circuit 135 is not permitted to close the power switch 123.

Figure 2:
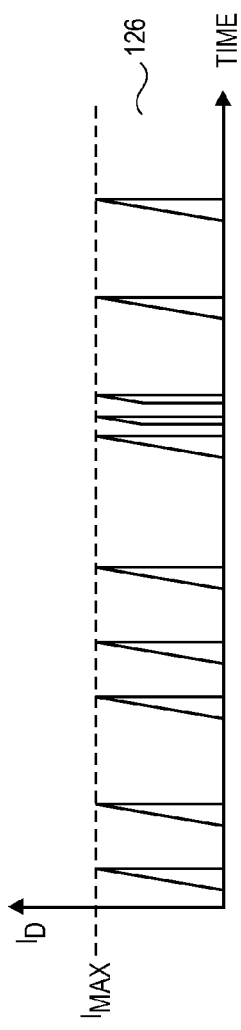
FIG. 2 is a diagram illustrating an embodiment of waveform of a switch current through a power switch in accordance with the teachings of the present invention.

In one embodiment, control circuit 135 includes an oscillator that generates a clock signal 181 that defines the switching periods. The control circuit 135 determines whether or not the power switch 123 is allowed to close during a clock period. When the feedback state signal 124 received by control circuit 135 is a logical high value, the control circuit 135 is enabled to close power switch 123 at the beginning of a switching period. As summarized above, control circuit 135 senses the current $I_D$ 126 through power switch 123 with current sense signal 147. In one embodiment, the power switch 123 opens after either a maximum on-time, or when the power switch 123 current $I_D$ 126 reaches a maximum value $I_{MAX}$. FIG. 2 is a diagram illustrating an embodiment of typical waveform of the current $I_D$ 126 through power switch 123. In one embodiment, control circuit 135 regulates the output of power supply 101 by keeping the power switch 123 off during some switching periods.

Figure 3:
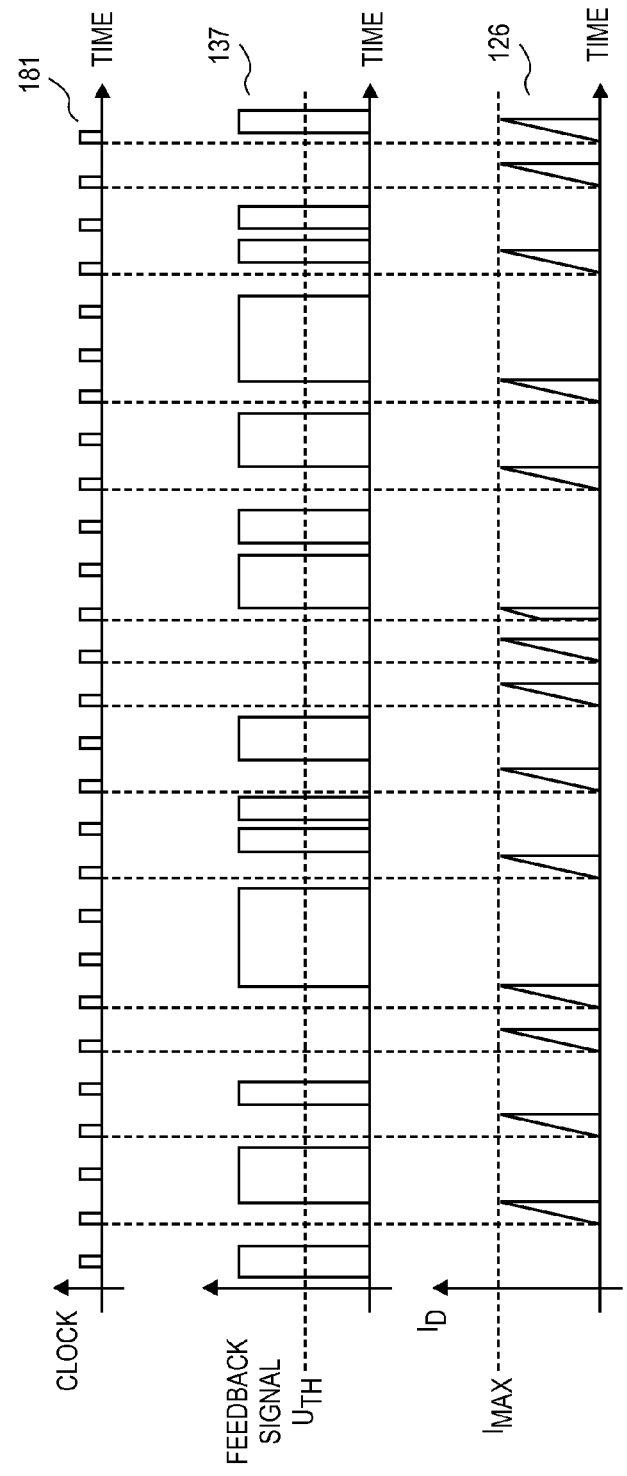
FIG. 3 is a diagram illustrating an embodiment of waveforms for a clock, a feedback signal and a switch current of a power supply regulator in accordance with the teachings of the present invention.

To illustrate, FIG. 3 is a diagram illustrating an embodiment of waveforms for a clock signal 181, which is internal to the control circuit, the feedback signal 137 and the switch current $I_D$ 126 of a power supply regulator in accordance with the teachings of the present invention. In the embodiment illustrated in FIG. 3, feedback circuit 133 is assumed to have ideal characteristics such that modulation signal 128 is substantially zero. In particular, FIG. 3 shows typical waveforms for the clock signal 181, the feedback signal 137, and the switch current $I_D$ 126 when the feedback circuit 133 has the ideal characteristics of high gain, high bandwidth, and no delay with the modulation signal 128 substantially zero. The power switch 123 operates in a pattern characterized by regular short intervals of clock periods where the power switch 123 is on, separated by intervals of clock periods where power switch 123 stays off. For any set of input and output conditions, there is a ratio between the number of clock periods when power switch 123 is on and the total number of clock periods that gives the desired regulated output for power supply 101. A desirable mode of operation is a repeating pattern of on and off clock periods that has a high fundamental frequency because the highest fundamental frequency gives the lowest magnitude of output ripple and reduces the likelihood of audio noise.

Figure 4:
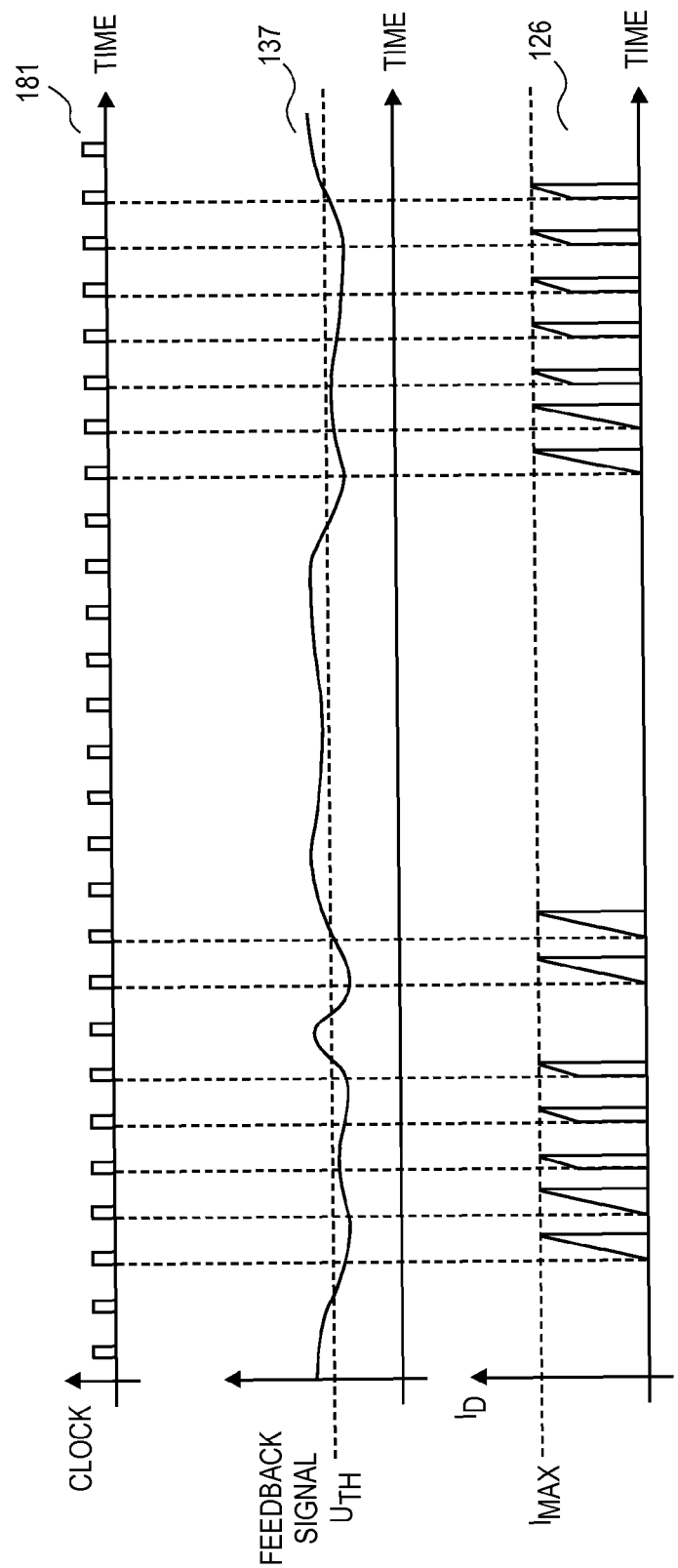
FIG. 4 is a diagram illustrating an embodiment of waveforms for a clock with distorted feedback signal and a resulting switch current of a power supply regulator as a consequence of missing adjustment circuitry in accordance with the teachings of the present invention.

In practice, the characteristics of the feedback circuit 133 are often not ideal. For example, low gain, low bandwidth, and delays in the feedback circuit 133 can distort the feedback signal 137 to create an undesirable pattern of on and off cycles. To illustrate, FIG. 4 is a diagram illustrating an embodiment of waveforms for a clock signal 181 with a non-ideal feedback circuit 137 resulting in a distorted feedback signal 137 and an undesirable pattern of switch current $I_D$ 126. In FIG. 4, the modulation signal 128 is assumed to be substantially zero. As shown, the switching of power switch 123 occurs in long intervals of clock cycles where the power switch 123 turns on, followed by long interval of clock cycles where the power switch 123 stays off. Such patterns of grouped pulses are undesirable because they can produce large output ripple and audio noise.

In various embodiments of the present invention, the ON/OFF control of a switching regulator that uses non-ideal feedback circuits is improved in accordance with the teachings of the present invention. The principle employed by embodiments of the present invention is to temporarily modify the feedback signal or the threshold level with a non-zero modulation signal 128 as appropriate to which the feedback signal is compared to compensate for the distortion caused by low gain, low bandwidth, and delay. Knowledge of the timing and the expected characteristics of the feedback signal under ideal conditions make the compensation possible.

To illustrate, attention is directed back to the adjustment circuit 105 included in the power supply regulator 103 of FIG. 1. As shown in the depicted embodiment, adjustment circuit 105 includes a state machine 149 coupled to a modulation source 151. In one embodiment, adjustment circuit 105 also includes an element 153, which is coupled to modulation source 151 and is coupled to receive the feedback signal 137 from the third terminal 121. In one embodiment, element 153 is coupled to combine the modulation signal 128 that is output from modulation source 151 with the feedback signal 137 to input 145 of comparator 139. As a result, the feedback signal that is output from element 153 and is compared with the threshold level $U_{TH}$ at input 141 is adjusted with modulation signal 128 in accordance with the teachings of the present invention. For example, in one embodiment, the adjustment causes the difference between the high value and low value of the feedback signal to be approximately 80 percent of the low value. As a result, the feedback state 124 signal at output 143 of comparator 139, which in one embodiment functions as the digital on/off signal or an enable signal to control circuit 135, is adjusted in accordance with the teachings of the present invention. In one embodiment, the adjustment to the feedback state 124 signal tends to cause the feedback state 124 signal to revert from a state at the time of adjustment to a state immediately preceding the adjustment in accordance with the teachings of the present invention.

In operation, state machine 149 in one embodiment is coupled to receive timing information from a clock signal 181 from control circuit 135. In addition, state machine 149 in one embodiment, is also coupled to receive information about the state of power supply 101 from the feedback state signal 124 generated at the output 143 of comparator 139. As shown, the state machine 149 causes the modulation signal 128 to be output from modulation source 151 to be added to the feedback signal 137 in accordance with the teachings of the present invention.

Figure 5A:
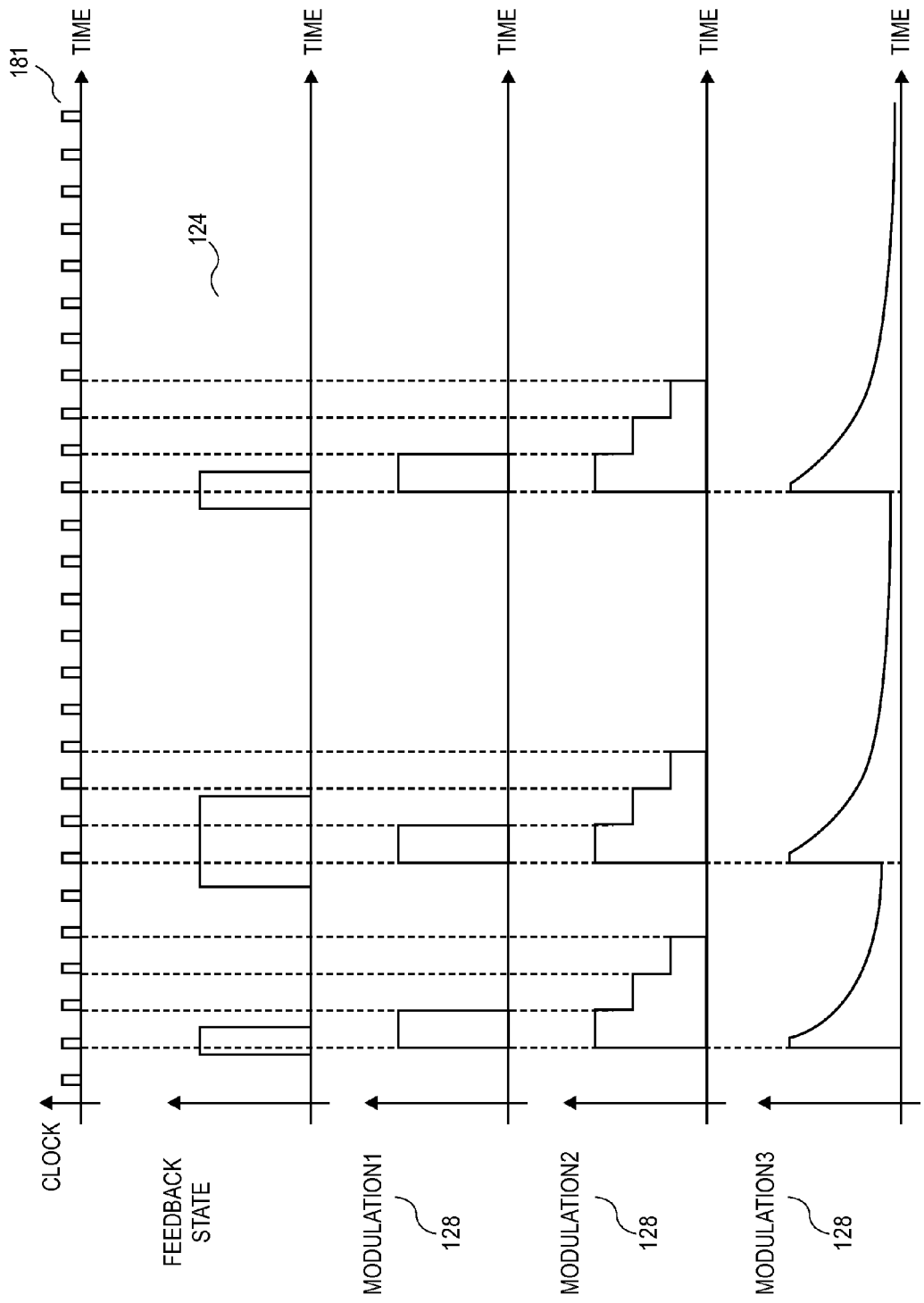
FIG. 5A shows diagrams illustrating embodiments of waveforms for a clock and feedback state events with various embodiments of modulation source waveforms of an embodiment of a power supply regulator in accordance with the teachings of the present invention.

FIG. 5A gives examples of various embodiments of modulation signal 128, which are shown as MODULATION1, MODULATION2 and MODULATION3, with respect to the clock signal 181 from control circuit 135 and the feedback state signal 124 or enable events from output 143 in accordance with the teachings of the present invention. In one embodiment, the modulation signal 128 from modulation source 151 provides the effect of artificially restoring information missing from the feedback signal 137. The result is an improvement in the pattern of switching cycles that increases the fundamental frequency of the sequence, reducing the magnitude of output ripple and lowering the likelihood of audio noise from power supply regulator 103 in accordance with the teachings of the present invention.

As can be seen in the various embodiments illustrated in FIG. 5A, the embodiment of modulation signal 128 shown as MODULATION1 is a fixed amplitude pulse that is produced in one embodiment when an embodiment of state machine 149 is implemented as a flip-flop. In contrast, the digital stepped modulation of MODULATION2 results in another embodiment with state machine 149 and circuitry included in modulation source 151 to result in the digital stepped modulation in accordance with the teachings of the present invention. In yet another embodiment, the smooth nonlinear ramp of MODULATION3 is an analog variant of MODULATION2 provided by another embodiment of state machine 149 and modulation source 151 in accordance with the teachings of the present invention. In various embodiments, different modulation signals 128 may be selected in accordance with the deficiencies of the feedback circuit 133 and the desired performance of power supply regulator 103 in accordance with the teachings of the present invention.

Figure 5B:
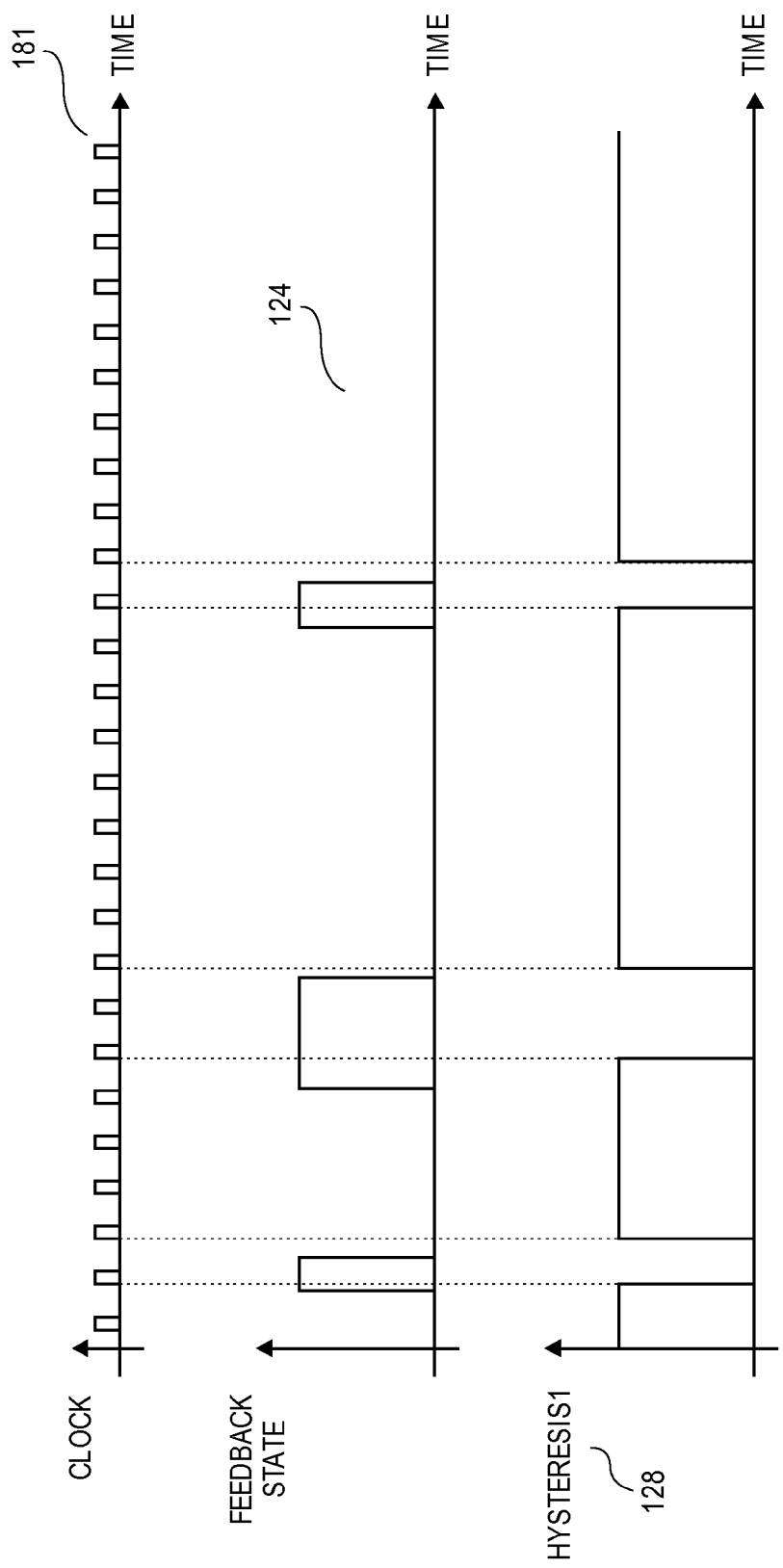
FIG. 5B shows additional diagrams illustrating an embodiment of waveforms for a clock and feedback state events with various embodiments of modulation source waveforms of an embodiment of a power supply regulator in accordance with the teachings of the present invention.

The various embodiments of modulation signal 128 in FIG. 5A are different from a conventional hysteresis signal modulation signal 128 that is illustrated in FIG. 5B. The conventional hysteresis signal, shown as HYSTERESIS1 modulation signal 128 in FIG. 5B, changes between two values depending on the feedback state 124. Changes in the value of the hysteresis signal HYSTERESIS1 modulation signal 128 are synchronized with the clock that determines the beginning of a switching cycle. When a feedback signal 137 cause a feedback state 124 to change from a previous state to a current state, the initial effect of a HYSTERESIS1 modulation signal 128 is to maintain the current state. The current state will be maintained as long as the subsequent changes to the feedback signal are less than the value of the hysteresis signal. For example, when the feedback signal 137 decreases to cause the feedback state 124 to change from a low state to a high state, the summation of HYSTERESIS1 modulation signal 128 with the feedback signal 137 would cause the feedback state 124 to remain in the high state when the feedback signal 137 increases by an amount less than the magnitude of the HYSTERESIS1 modulation signal 128. Although variants of a conventional hysteresis signal may have more than one value or may change value with time, the initial effect of a hysteresis signal is to maintain the current state of a feedback state 124.

In contrast to a conventional hysteresis signal, a modulation signal is not limited to two values, and the value of a modulation signal is determined by more than just the current feedback state 137. The value of a modulation signal may be determined by the previous feedback state as well as the current feedback state. The value of a modulation signal may vary with time in a way that is unrelated to the current state or to the previous state. A fundamental distinction between a modulation signal and a conventional hysteresis signal is that the summation of a modulation signal 128 with a feedback signal 137 has the initial effect to alter the feedback state 124, whereas the summation of a HYSTERESIS1 modulation signal 128 with a feedback signal 137 has the initial effect to maintain the feedback state 124. For example, when a feedback signal 137 decreases to cause the feedback state 124 to change from a low state to a high state, a modulation signal 128 would cause the feedback state 124 to revert to its former low state if the original decrease of feedback signal 137 was not sufficient to keep feedback state 124 in the high. The initial effect of a modulation signal is opposite to the initial effect of a hysteresis signal.

Figure 6A:
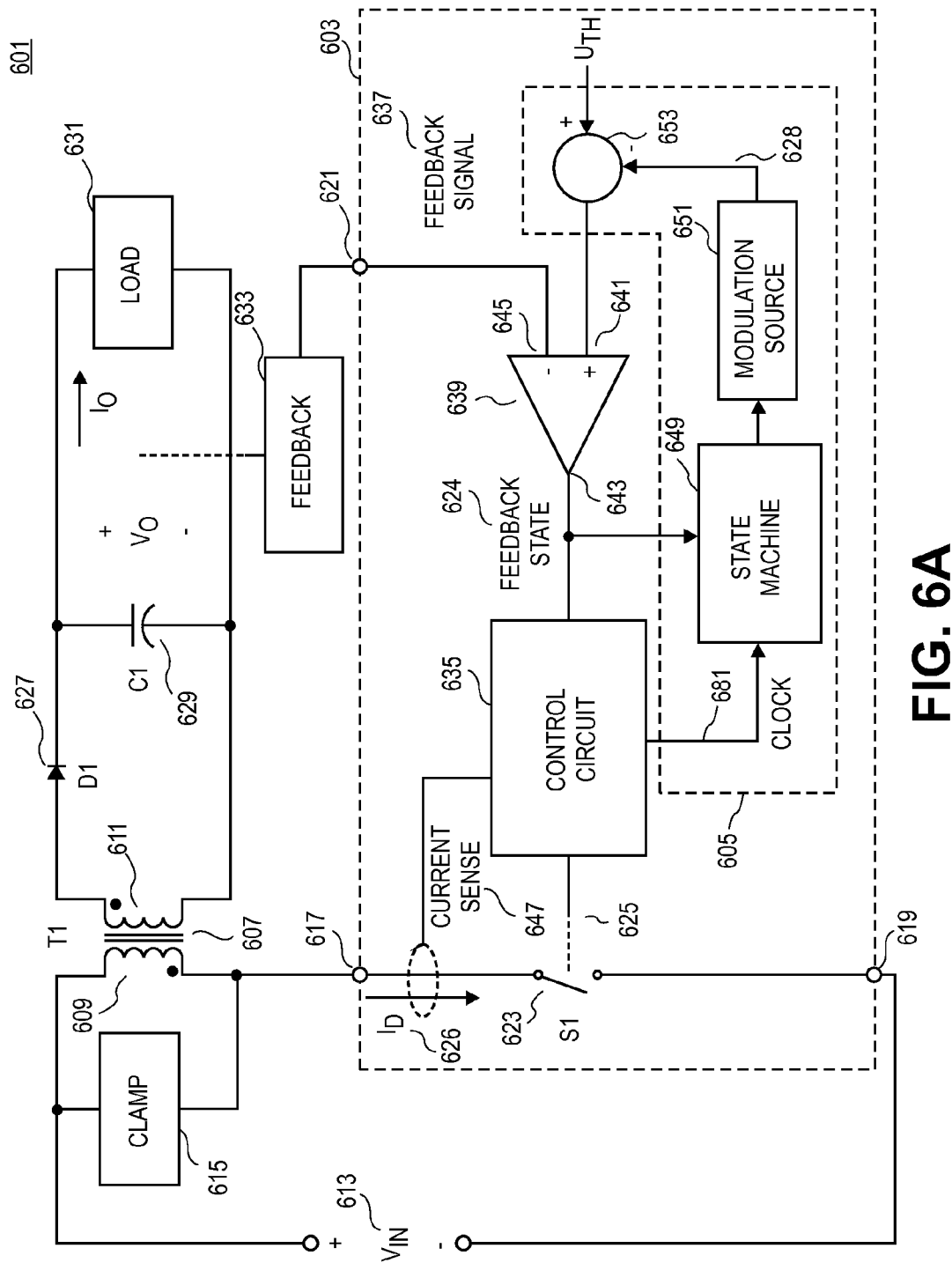
FIG. 6A is a block diagram illustrating an embodiment of waveforms for another embodiment of a power supply including another embodiment of an adjustment circuit in a power supply regulator in accordance with the teachings of the present invention.

FIG. 6A is a block diagram illustrating another embodiment of a power supply 601 including another embodiment of an adjustment circuit 605 in a power supply regulator 603 in accordance with the teachings of the present invention. The embodiment of power supply regulator 603 shares similarities with the embodiment of power supply regulator 103 of FIG. 1. As shown, a voltage $V_{IN}$ 613 is coupled across an input of power supply 601 and is coupled to a primary winding 609 of an energy transfer element 607. A clamp 615 is coupled across primary winding 609 to clamp the voltage across primary winding 609. A first terminal 617 of power supply regulator 603 is coupled to energy transfer element 607 and a second terminal 619 is coupled to an input of power supply 601. In operation, a power switch 623 of power supply regulator 603 is switched to couple or decouple the first terminal 617 from the second terminal 619 in response to a control signal 625, which is generated by a control circuit 635 of power supply regulator 603. The switching of power switch 623 regulates the transfer of energy from primary winding 609 to a secondary winding 611 of energy transfer element 607. In the illustrated embodiment, diode 627 and capacitor 629 are coupled to secondary winding 611 at an output of power supply 601 such that a load 631 coupled to the output of power supply 601 is powered by receiving an output voltage $V_O$ and an output current $I_O$.

As shown in the illustrated embodiment, a feedback circuit 633 is coupled to the output power supply 601 to generate a feedback signal 637, which is representative of an output level of power supply 601. In one embodiment, a third terminal 621 of power supply regulator 603 is coupled to receive feedback signal 637.

As shown in FIG. 6A, power supply regulator 603 also includes one embodiment of a comparator 639 having an output 643 from which the results of a comparison between an input 641 and an input 645 are generated. One difference between the embodiments of power supply regulator 103 of FIG. 1 and power supply regulator 603 of FIG. 6A is with respect to the inputs to respective comparators 139 and 693. In particular, referring to FIG. 1, since the output 143 of comparator 139 is responsive to the difference between the inputs 141 and 145, a subtraction of modulation from the threshold value $U_{TH}$ would have the same effect as addition of the same modulation to the feedback signal 137.

Accordingly, referring back to the embodiment illustrated in FIG. 6A, input 645 is coupled to receive feedback signal 637 from third terminal 621, while input 641 is coupled to element 653, which is coupled to combine threshold level $U_{TH}$ with a modulation signal 628 from modulation source 651. In the embodiment shown in FIG. 6A, element 653 is illustrated as subtracting a modulation signal 628 from $U_{TH}$ in accordance with the teachings of the present invention. In one embodiment, the adjustment causes the difference between the high value and low value of $U_{TH}$ to be approximately 80 percent of the low value. In operation, the output 643 of comparator 639 is a feedback state signal 624, which in one embodiment functions as a digital on/off signal or an enable signal to control circuit 635. Thus, when the signal at input 645, which is representative of the output level of power supply 601, is greater than the adjusted threshold value $U_{TH}$, then the feedback state signal 624 at output 643 is a first state and when the signal at input 645 is less than the adjusted threshold value $U_{TH}$, then the feedback state signal 624 at output 643 is a second state. In one embodiment, the adjustment to the feedback state signal 624 tends to cause the feedback state signal 624 to revert from a state at the time of adjustment to a state immediately preceding the adjustment in accordance with the teachings of the present invention. In one embodiment, control circuit 635 includes a current limit circuit, which is coupled to receive a current sense signal 647 from power switch 623. In one embodiment, current sense signal 647 is representative of a current $I_D$ 626 through the power switch 623 and control circuit 635 also utilizes current sense signal 647 to help control the regulation of power supply 601.

Figure 6B:
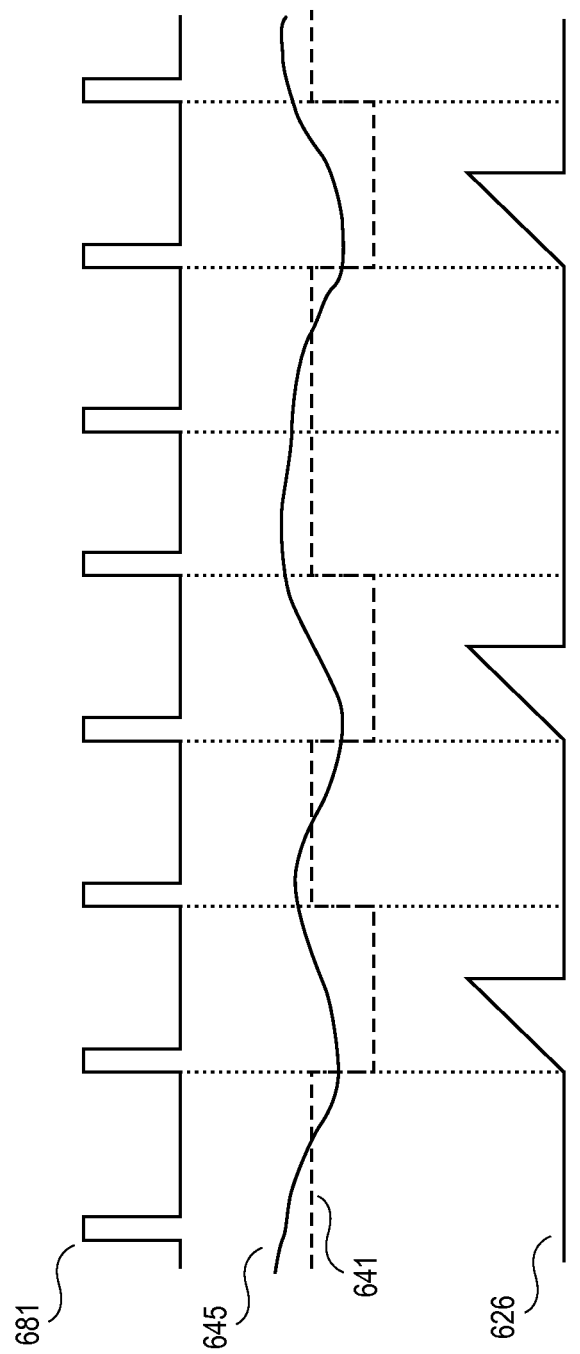
FIG. 6B shows embodiments of example waveforms of signals that use a modulation signal in accordance with the teachings of the present invention.

In one embodiment, the operation and function of adjustment circuit 605 of FIG. 6A is similar to the operation and function of adjustment circuit 105 of FIG. 1, with a difference being that that the threshold level $U_{TH}$ is adjusted instead of the feedback signal, as discussed. As shown, state machine 649 is coupled to receive clock signal 681 from control circuit 635 and feedback state signal 624 from the output 643 of comparator 639 to control the modulation signal 628 from modulation source 651. Various embodiments of the modulation signal 628 are illustrated as MODULATION1, MODULATION2 or MODULATION3 waveforms in FIG. 5, which may be produced by various embodiments of adjustment circuit modulation source 651 in accordance with the teachings of the present invention. FIG. 6B shows waveforms of clock signal 681, signals 645 and 641 to the input of comparator 639, and switch current $I_D$ 626 for one embodiment that uses modulation signal 628 of the form illustrated in FIG. 5A as MODULATION1. The signals in FIG. 6B illustrate how the introduction of a modulation signal 628 produces a desirable pattern of on and off switching cycles in response to a distorted feedback signal.

Figure 7A:
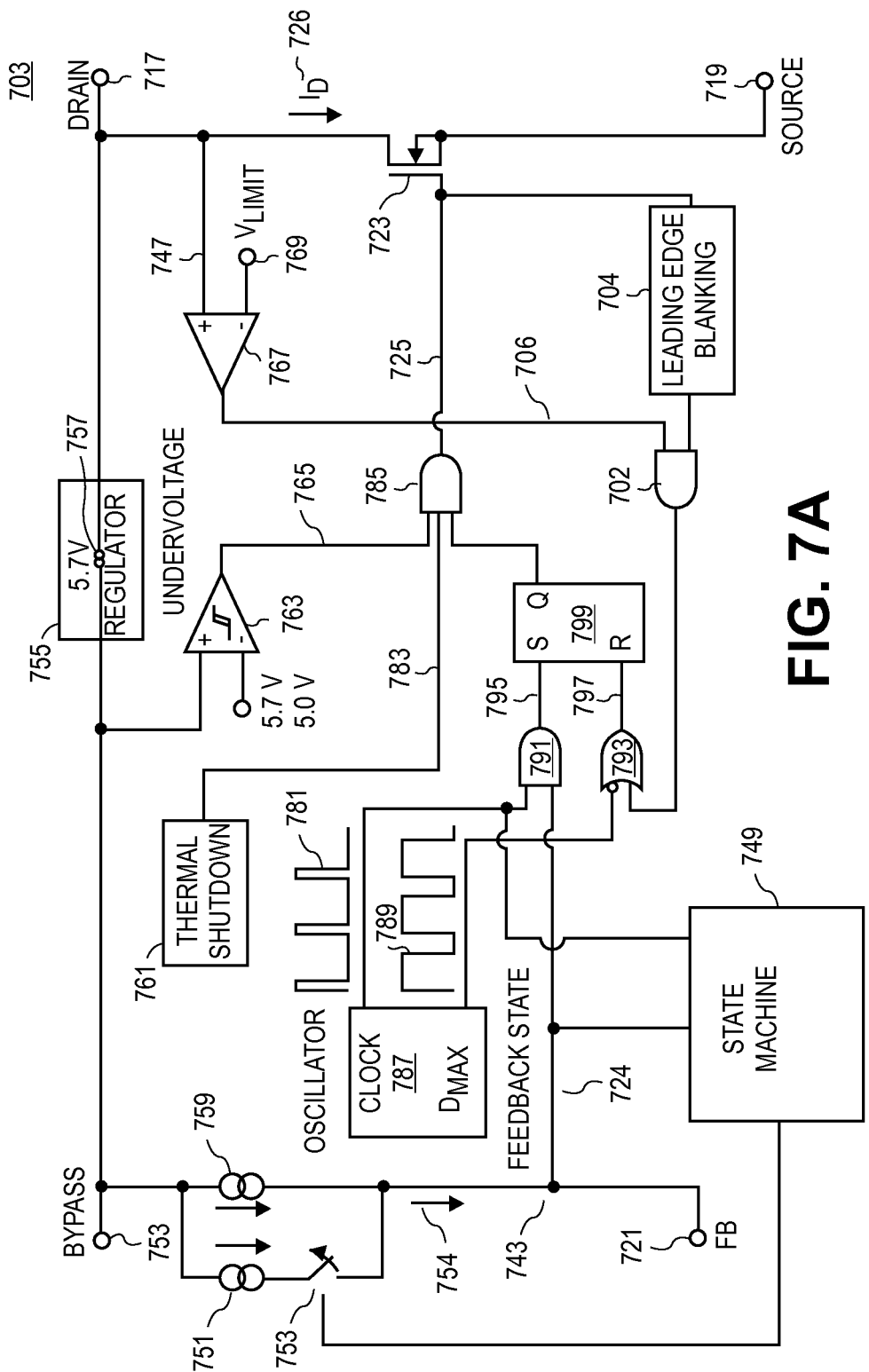
FIG. 7A is a block diagram illustrating an embodiment of a power supply regulator including an embodiment of an adjustment circuit in accordance with the teachings of the present invention.
Figure 7B:
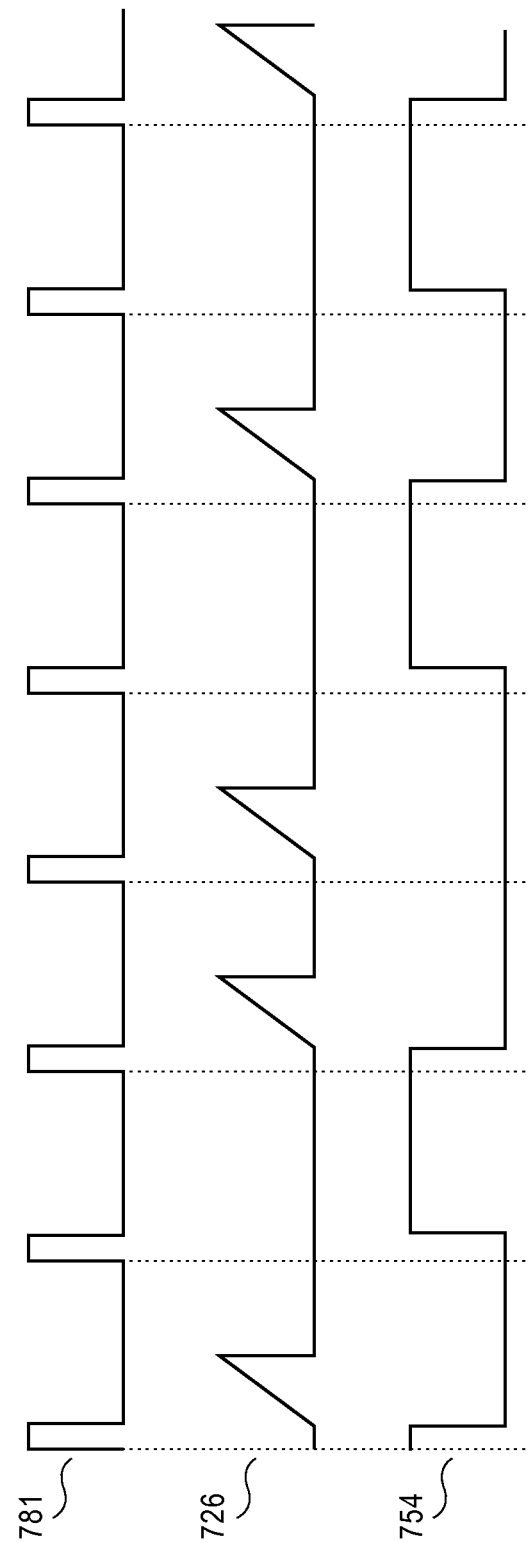
FIG. 7B is a diagram that shows examples of waveforms that may be found in FIG. 7A in accordance with the teachings of the present invention.

FIG. 7A is a block diagram illustrating an embodiment of a power supply regulator 703 and FIG. 7B is a diagram that shows examples of corresponding waveforms that may be found in FIG. 7A in accordance with the teachings of the present invention. As shown in the illustrated embodiment, the power supply regulator includes a power switch 723 that is coupled between a drain terminal 717 and a source terminal 719. In one embodiment, power switch 723 includes a metal oxide semiconductor field effect transistor (MOSFET). Power switch 723 is switched on and off according to control signal 725, which is received from AND gate 785. The inputs to AND gate 785 include an output of latch 799, a bypass terminal 753 voltage indicator signal 765 provided by an undervoltage comparator 763, and a thermal status signal 783 from thermal shut down circuit 761. An oscillator 787 is included in power supply regulator 703 and generates a maximum duty cycle signal 789, which determines the maximum time that power switch 723 can couple drain terminal 717 and source terminal 719 in each cycle of operation.

In one embodiment, thermal shut down circuit 761 monitors the temperature of the power supply regulator 703 and provides the thermal status signal 783 as long as the temperature is below a threshold temperature. In one embodiment, the threshold temperature is 135 degrees Celsius.

In one embodiment, the inputs to latch 799 include an OR gate 793 output signal 797 and an AND gate 791 output signal 795. The AND gate 791 output signal 795 is provided when no current is provided to feedback terminal 721. AND gate 791 provides output when an active feedback state signal 724 or enable signal is received from node 743 and oscillator 787 provides an active clock signal 781. Additionally, current source 759 will pull the feedback state signal 724 or enable signal to a logic high state when the current provided to feedback terminal 721 is less than the current source 759 current. In one embodiment, the current source 759 current is 50 microamperes. In operation, when the feedback state signal 724 or enable signal is high from node 743, the clock signal 781 is transferred to latch 799 by the AND gate 791, thereby setting the latch 799 and enabling that cycle to go through and turn on the power switch 723. Conversely, when the feedback state signal 724 or enable signal from node 743 is low, it blocks the clock signal 781 from setting the latch 799, and keeps the power switch 723 off during that cycle. Thus, when the feedback state signal 724 or enable signal from node 743 is low, then the AND gate 791 output signal 795 is an oscillating signal having a frequency of substantially zero. When the feedback state signal 724 or enable signal from node 743 is not low, then the AND gate 791 output signal 795 is an oscillating signal having a substantially non-zero frequency.

In one embodiment, a current sense signal 747 is coupled to sense a current $I_D$ 726 through power switch 723. A current limit threshold comparator 767 is coupled to receive the current sense signal 747 and compare it with a $V_{LIMIT}$ 769 value. When the current $I_D$ 726 through power switch 723 is greater than a current limit, the voltage across power switch 723, as sensed with current sense signal 747, will be greater than $V_{LIMIT}$ 769 and an active current limit signal 706 is output by comparator 767. AND gate 702 is coupled to receive the current limit signal 706 and a signal from leading edge blanking circuit 704. In one embodiment, leading edge blanking circuit 704 disables OR gate 793 from sensing a current limit condition during a short time after power switch 723 turns on. In operation, the output of AND gate 702 is received by OR gate 793 when the current threshold limit signal 706 is reached or during the time when maximum duty cycle signal 789 is in an off state. In operation OR gate 793 output signal 797 will be provided when the maximum duty cycle signal 789 is off or when the current limit is sensed by current sense 747 is reached in order to turn off the power switch 723.

In operation, power switch 723 is held off during the next switching cycle when the current provided by feedback terminal 721 pulls the enable signal at node 743, which is the feedback state signal 724, low to create a condition where there will be no additional power supplied to the load. When the current provided by feedback terminal 721 falls below the current source 759 current, the feedback state signal 724, which is the enable signal at node 743, is high due to the operation of current source 759, and power switch 723 will resume operation upon the beginning of the next on-period of the maximum duty cycle signal 789.

In one embodiment, a regulator circuit 755, which includes a current source 757 functions as a bypass charge circuit and regulates the voltage level which in one embodiment is five point seven (5.7) volts of a capacitor externally coupled to bypass terminal 753. This is done in one embodiment by charging the capacitor externally coupled to bypass terminal 753 when power switch 723 is not conducting. Undervoltage circuit 763 prevents the power switch 723 from conducting again until the voltage at bypass terminal 753 reaches the desired voltage level.

In the illustrated embodiment, the feedback state signal 724 or enable signal on node 743 is adjusted in accordance with the teachings of the present invention by switchably coupling current source 751 to node 743 through switch 753 in response to state machine 749. In one embodiment, current source 751 may be considered to be a modulation source and switch 753 may be considered to be an element to switchably combine the feedback signal with the modulation source in response to state machine 749 in accordance with the teachings of the present invention. As illustrated, current source 751 is switched in parallel with current source 759 to change the current provided to node 743. In one embodiment, the current source 751 current is 40 microamperes and the current source 759 current is 50 microamperes. In one embodiment, state machine 749 receives the feedback state signal 724 or enable signal from node 743 and the clock signal 781. In one embodiment, state machine 749 includes logic that in one embodiment is a flip-flop. Thus, the value of the feedback current that determines whether the feedback state signal 724 or enable signal from node 743 is high or low is modulated by the current from current source 751. In one embodiment, the feedback current is modulated by a pulse. In another embodiment, the current is modulated by a ramp. In one embodiment, a plurality of current sources may be switched in parallel with current source 759, individually responsive to state machine 749 to modulate the current provided to the feedback terminal 721 in accordance with the teachings of the present invention.

Figure 8:
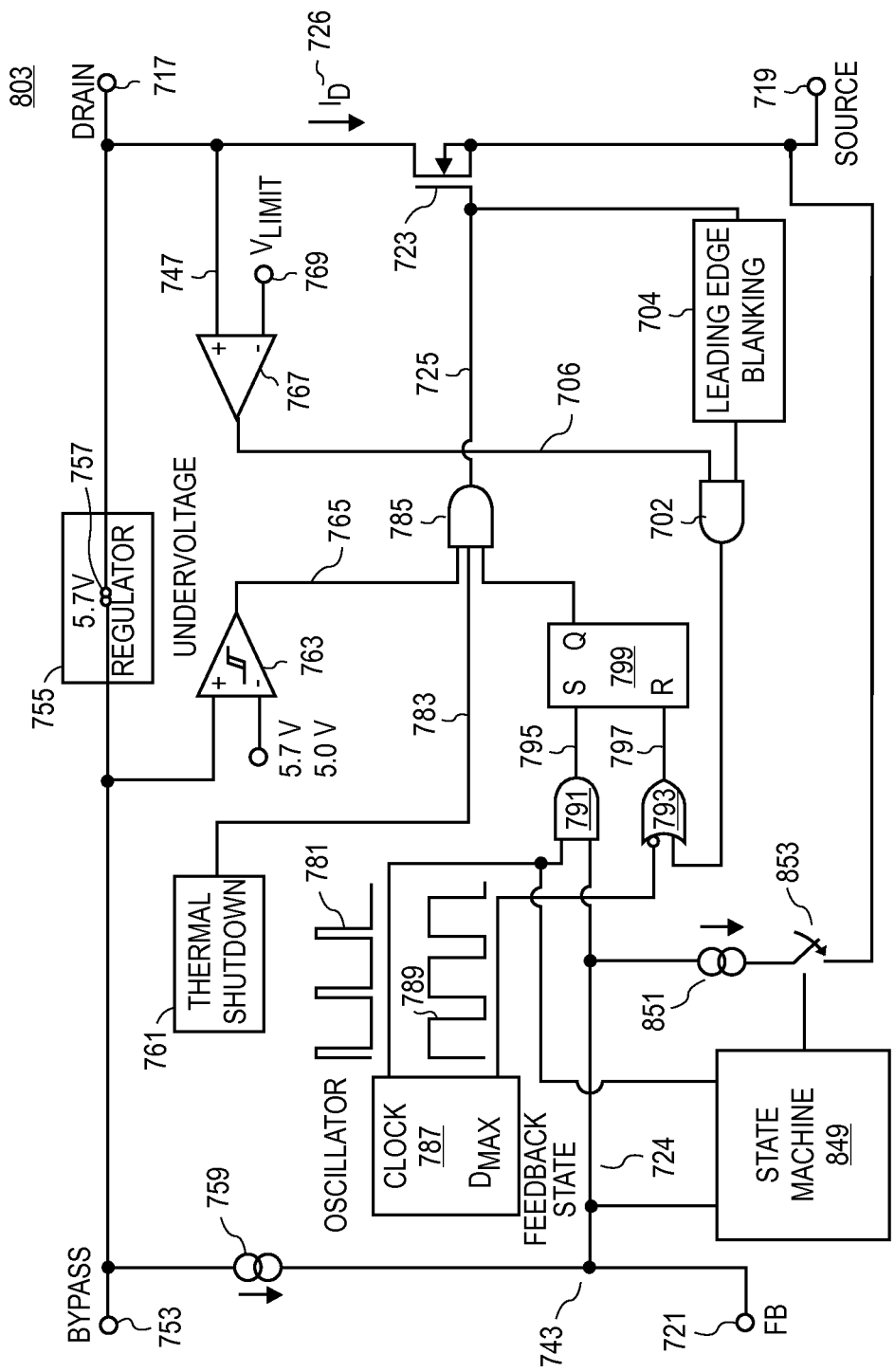
FIG. 8 is a block diagram illustrating another embodiment of a power supply regulator including another embodiment of an adjustment circuit in accordance with the teachings of the present invention.

FIG. 8 is a block diagram illustrating another embodiment of a power supply regulator 803 in accordance with the teachings of the present invention. As can be observed, power supply regulator 803 of FIG. 8 is similar to power supply regulator 703 of FIG. 7. In the illustrated embodiment, power supply regulator 803 is functionally equivalent to power supply regulator 703 and share a number of common elements. A difference between power supply regulator 803 and power supply regulator 703 is that current source 851 is switchably coupled through switch 853 to remove current from node 743 or feedback terminal 721 to adjust the feedback state signal 724 or enable signal from node 743 in response to state machine 849 as shown. In one embodiment, current source 759 current is 90 microamperes and current source current 851 is 40 microamperes.

In particular, the embodiment shown in FIG. 8 shows current source 851 coupled to node 743 and the feedback terminal 721 and switched in response to a state machine 849. State machine 849 receives the feedback state signal 724 or enable signal from node 743 and clock signal 781. In one embodiment, state machine 849 includes logic that in one embodiment is a flip-flop. Thus, the value of the feedback current at feedback terminal 721 that determines whether the feedback state signal 724 or enable signal is high or low is modulated by the current from current source 851 in accordance with the teachings of the present invention. In one embodiment, current source 851 has a constant value such that a current pulse is subtracted from the feedback terminal 721 in response to state machine 849. In another embodiment, current source 851 increases or decreases with time such that a ramp is subtracted from the feedback terminal 721 in response to state machine 849. In one embodiment, a plurality of current sources may be switched individually in response to a state machine 849 to add or remove current from the feedback terminal 721, modulating the current that determines whether the feedback state signal 724 or enable signal from node 743 is high or low in accordance with the teachings of the present invention.

Figure 9:
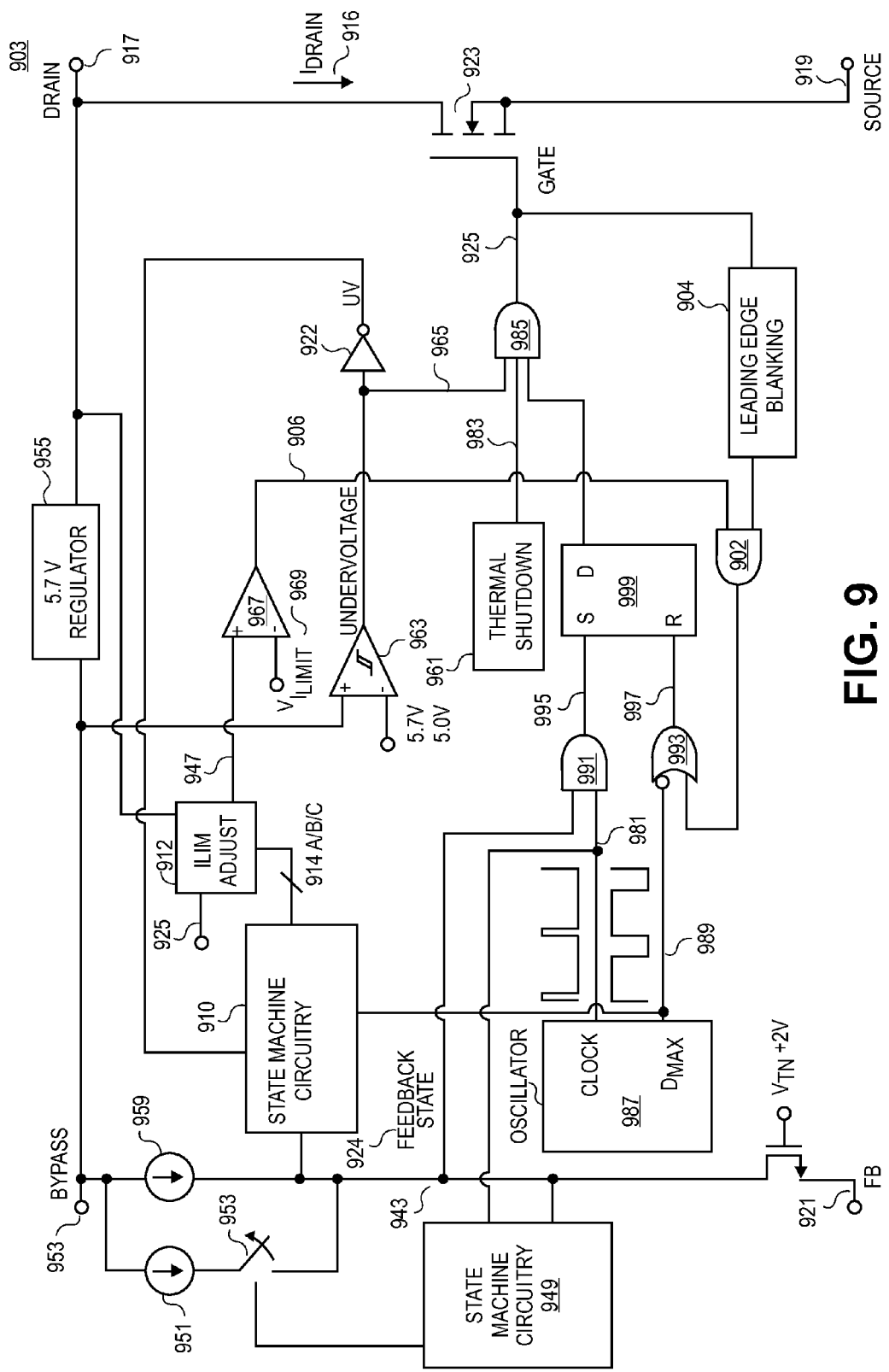
FIG. 9 is a block diagram illustrating yet another embodiment of a power supply regulator including yet another embodiment of an adjustment circuit in accordance with the teachings of the present invention.

FIG. 9 is a block diagram illustrating yet another embodiment of a power supply regulator 903 in accordance with the teachings of the present invention. As shown, switching regulator circuit 903 includes a power switch 923, which in one embodiment includes a MOSFET that is coupled between a drain terminal 917 and a source terminal 919. Power switch 923 is switched on and off according to a control signal 925 generated by the control circuit. In one embodiment, control signal 925 is input into the gate of power switch 923 by AND gate 985. In one embodiment, the control circuit includes AND gates 991 and 985, OR gate 993, latch 999, oscillator 987, state machine circuitry 910, current limit adjust circuitry 912 and their associated elements. The input of AND gate 985 includes an output of a latch 999, a bypass terminal 953 voltage indicator 965 provided by undervoltage comparator 963, and a thermal status signal 983 from thermal shut-down circuit 961. In one embodiment, maximum duty cycle signal 989 generated by oscillator 987 determines the maximum time that power switch 923 can conduct in each cycle of operation.

When the current being pulled out of the feedback terminal 921 is greater than an enable threshold current provided by current source 959, the feedback state signal 924 or enable signal from node 943 will be pulled to a low state. When the current being pulled out of the feedback terminal 921 is less than the enable threshold current provided by current source 959, the feedback state signal 924 or enable signal from node 943 will be pulled to a high state. As shown, the feedback state signal 924 or enable signal from node 943 is also coupled to be received by the state machine circuitry 910. State machine circuitry 910 will send signals 914 to the current limit (Ilim) adjust circuitry 912, setting the current limit of $I_{DRAIN}$ 916 through power switch 923 to be lower at light load or higher at high load. In one embodiment, there are three signals 914A, 914B and 914C included in signals 914.

In one embodiment, current limit adjust circuitry 912 adjusts the current limit in digital steps. Transitions to a higher current limit state occur after a pattern of N consecutive feedback state signal 924 or enable signal logic highs from node 943. Transitions to a lower current limit state occur after a pattern of N consecutive feedback state signal 924 or enable signal logic lows from node 943. In one embodiment, N equals 6.

In one embodiment, the inputs to latch 999 include an OR gate 993 output signal 997 and an AND gate 991 output signal 995. The AND gate 991 output signal 995 is high only when feedback state 924 and clock signal 981 generated by oscillator 987 are both high. Thus, AND gate 991 provides output when logical high signal 943 is received and clock signal 981 is provided by oscillator 987. In operation, when signal 943 is high, the clock signal 981 is transferred to latch 999 by the AND gate 991, thereby setting the latch 999 and enabling that cycle to go through and turn on the power switch 923. Conversely, when the signal 943 is low, it blocks the clock signal 981 from setting the latch 999, and keeps the power switch 923 off during that cycle.

In one embodiment, OR gate 993 output signal 997 is provided when the current threshold limit is reached as indicated by signal 906 or during the time when maximum duty cycle signal 989 is in an off state. In operation, OR gate 993 output signal 997 is high when either the maximum duty cycle signal 989 is low or when the current limit is reached as indicated with signal 906 after the leading edge blanking delay, which is determined by leading edge blanking circuit 904 through AND gate 902, in order to turn off the power switch 923.

In one embodiment, signal 947 generated by current limit adjust circuitry 912 is a voltage level proportional to the voltage across the power switch 923. Current limit states are determined by signals 914A, 914B and 914C, which are generated by state machine circuitry 910. At higher current limit states, current limit adjust circuitry 912 changes signal 947 to become a lower proportion of the voltage across power switch 923. At lower current limit states, current limit adjustment circuitry 912 causes signal 947 to become a higher proportion of the voltage across power switch 923. Current threshold comparator 967 then compares current threshold limit voltage $V_{ILIMIT}$ 969 to the set voltage signal 947. If the current threshold limit voltage $V_{ILIMIT}$ 969 is above signal 947, the current limit signal is triggered, and the power switch 923 is turned off until the beginning of the next on-time.

In one embodiment, the switching regulator circuit 903 turns off the power switch 923 after the current on cycle when the signal 943 is pulled low and creates a condition where there will be no additional power supplied to the load. Accordingly, signal 943 in response to the output of the power supply selectively allows the on time of a current cycle of control signal 925 to be maintained and not allow or disable an on time of a next cycle of control signal 925. When signal 943 is pulled high, the power switch 923 will resume operation upon the beginning of the next on-period of the maximum duty cycle signal 989.

In one embodiment, a bypass charge circuit or 5.7 V regulator 955, which includes the current source from the drain terminal 917 to the bypass terminal 953, regulates the power level of capacitor externally coupled to bypass terminal 953 at a voltage level, which in one embodiment is 5.7 volts. This is done by charging the capacitor that is externally coupled to bypass terminal 953 while the power switch 923 is not conducting. In one embodiment, undervoltage comparator 963 prevents the power switch 923 from conducting again until the voltage at bypass terminal 953 reaches the desired voltage level. Inverter 922 inverts the output of an undervoltage comparator 963.

In the illustrated embodiment, the feedback state signal 924 or enable signal from node 943 is adjusted in accordance with the teachings of the present invention by switchably coupling current source 951 to node 943 through switch 953 in response to state machine 949. In one embodiment, current source 951 may be considered to be a modulation source and switch 953 may be considered to be an element to switchably combine the feedback signal from feedback terminal 921 with the modulation source in response to state machine 949 in accordance with the teachings of the present invention. As illustrated, current source 951 is switched in parallel with current source 959 to change the current provided to node 943. In one embodiment, current source 959 current is 50 microamperes and current source 951 current is 40 microamperes. In one embodiment, state machine 949 receives the feedback state signal 924 or enable signal from node 943 and the clock signal 981. In one embodiment, state machine 949 includes logic that in one embodiment includes a flip-flop. Thus, the value of the feedback current that determines whether the feedback state signal 924 or enable signal from node 943 is high or low is modulated by the current from current source 951. In one embodiment, the feedback current is modulated by a pulse. In another embodiment, the current is modulated by a ramp. In one embodiment, a plurality of current sources may be switched in parallel with current source 959, individually responsive to state machine 949 to modulate the current provided to the feedback terminal 921 in accordance with the teachings of the present invention.

Figure 10:
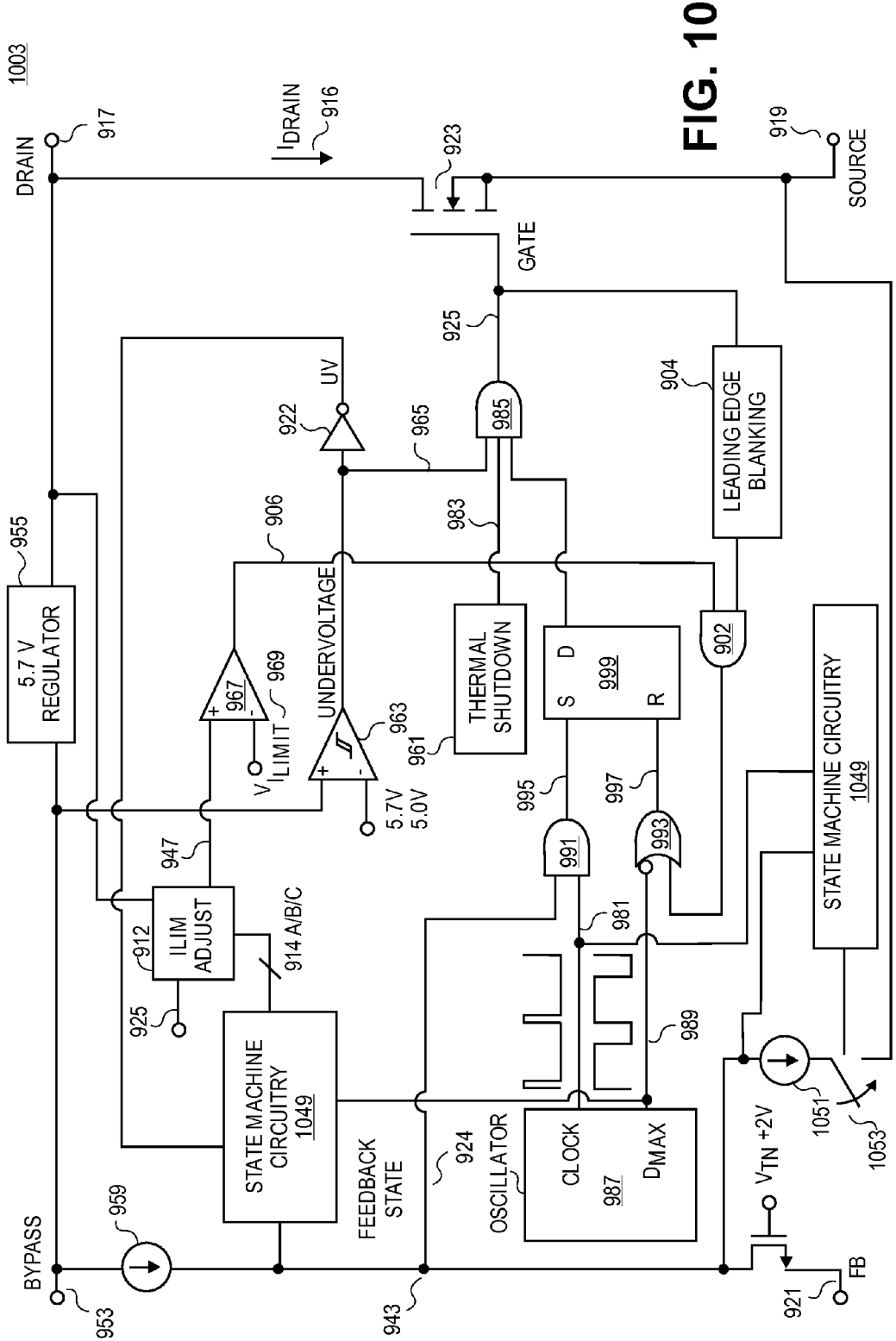
FIG. 10 is a block diagram illustrating still another embodiment of a power supply regulator including still another embodiment of an adjustment circuit in accordance with the teachings of the present invention.

FIG. 10 is a block diagram illustrating still another embodiment of a power supply regulator in accordance with the teachings of the present invention. As can be observed, power supply regulator 1003 of FIG. 10 is similar to power supply regulator 903 of FIG. 9. In the illustrated embodiment, power supply regulator 1003 is functionally equivalent to power supply regulator 903 and shares a number of common elements. A difference between power supply regulator 1003 and power supply regulator 903 is that current source 1051 is switchably coupled through switch 1053 to remove current from node 943 or feedback terminal 921 to adjust the feedback state signal 924 or enable signal from node 943 in response to state machine 1049 as shown. In one embodiment, current source 959 current is 90 microamperes and current source 1051 current is 40 microamperes.

In particular, the embodiment shown in FIG. 10 shows current source 1051 coupled to node 943 and switched to source terminal 919 in response to a state machine 1049. State machine 1049 receives the feedback state signal 924 or enable signal from node 943 and clock signal 981. In one embodiment, state machine 1049 includes logic that in one embodiment includes a flip-flop. Thus, the value of the feedback current at feedback terminal 921 that determines whether the feedback state signal 924 or enable signal is high or low is modulated by the current from current source 1051 in accordance with the teachings of the present invention. In one embodiment, current source 1051 has a constant value such that a current pulse is subtracted from the feedback terminal 921 in response to state machine 1049. In another embodiment, current source 1051 increases or decreases with time such that a ramp is subtracted from the feedback terminal 921 in response to state machine 1049. In one embodiment, a plurality of current sources may be switched individually in response to a state machine 1049 to add or remove current from the feedback terminal 921, modulating the current that determines whether the feedback state signal 924 or enable signal from node 943 is high or low in accordance with the teachings of the present invention.

In the foregoing detailed description, the methods and apparatuses of the present invention have been described with reference to a specific exemplary embodiment thereof. It will, however, be evident that various modifications and changes may be made thereto without departing from the broader spirit and scope of the present invention. The present specification and figures are accordingly to be regarded as illustrative rather than restrictive.

What is claimed is:

1. A power supply, comprising:
an energy transfer element coupled to transfer energy from an input to an output of the power supply;
a switch coupled to the energy transfer element to control the transfer of energy between the input and output of the power supply;
a feedback circuit coupled to the output of the power supply to generate a feedback signal representative of an output level at the output of the power supply;
a comparator coupled to receive the feedback signal and a threshold value signal to provide a feedback state signal having a first feedback state that represents the output level of the power supply being above a threshold level and a second feedback state that represents the output level of the power supply being below the threshold level;
a state machine coupled to receive the feedback state signal from the comparator to selectively modulate a first signal in response to the feedback state signal, wherein the first signal is a signal selected from the group consisting of the feedback signal and the threshold value signal, wherein the state machine is coupled to modulate the first signal in response to a previous feedback state of the feedback state signal; and
a control circuit coupled to receive the feedback state signal from the comparator to control switching of the switch to regulate the output level of the power supply in response to the feedback state signal.

2. The power supply of claim 1, wherein the state machine is coupled to modulate the first signal in response to whether the feedback state signal is in the first feedback state or the second feedback state.

3. The power supply of claim 1, wherein the state machine includes a flip-flop.

4. The power supply of claim 1, further comprising an oscillator coupled to the control circuit to generate a clock signal, wherein the control circuit is coupled to control switching of the switch in response to the clock signal and the feedback state signal to regulate the output level of the power supply.

5. The power supply of claim 4, wherein the state machine is further coupled to receive the feedback state signal and the clock signal, wherein the state machine is coupled to modulate the first signal to cause the feedback state signal to revert from a current feedback state to a previous feedback state in response to the feedback state signal and the clock signal.

6. The power supply of claim 1, further comprising a modulation source coupled to the state machine to generate a modulation signal in response thereto, wherein the modulation signal is coupled to be combined with the first signal.

7. The power supply of claim 6, wherein the modulation signal includes a fixed amplitude pulse waveform.

8. The power supply of claim 6, wherein the modulation signal includes a digital stepped modulation waveform.

9. The power supply of claim 6, wherein the modulation signal includes a smooth nonlinear ramp waveform.

10. The power supply of claim 1, further comprising:
a current limit comparator having a first input coupled to receive a threshold signal representative of a current limit, and a second input coupled to receive a switch current signal representative of a current through the switch, and an output coupled to generate a current limit signal to turn off the power switch in response to the current through the switch exceeding the current limit; and
a current limit adjust circuit coupled to the current limit comparator to adjust the current limit to be lower at light loads than at higher loads.

11. The power supply of claim 10, wherein the current limit adjust circuit adjusts the current limit in digital steps.

12. The power supply of claim 10, wherein the current limit adjust circuit adjusts the current limit to a higher current limit in response to the feedback state signal being in the first feedback state for two or more consecutive switch cycles.

13. The power supply of claim 10, wherein the state machine provides one or more signals to the current limit adjust circuit in response to the feedback state signal to adjust the current limit.

14. A power supply regulation circuit, comprising:
a feedback circuit coupled to an output of a power supply to generate a feedback signal representative of an output level at the output of the power supply;

a comparator coupled to receive the feedback signal and a threshold value signal and coupled to output a feedback state signal having a first feedback state that represents the output level of the power supply being above a threshold level and a second feedback state that represents the output level of the power supply being below the threshold level;

a state machine coupled to receive the feedback state signal from the comparator to selectively modulate the threshold value signal in response to a present logic state of the feedback state signal, wherein the state machine is further coupled to selectively modulate the threshold value signal in response to a previous logic state of the feedback state signal and the present logic state of the feedback state signal; and a control circuit coupled to receive the feedback state signal from the comparator to control switching of a switch coupled to regulate the output level of the power supply in response to the feedback state signal.

15. The power supply regulation circuit of claim 14 further comprising a modulation source coupled to the state machine to adjust the threshold value signal.

16. The power supply regulation circuit of claim 15, wherein the modulation source includes a current source coupled to adjust the threshold value signal.

17. The power supply regulation circuit of claim 14 wherein the state machine includes a flip-flop.

18. The power supply regulation circuit of claim 14, wherein the state machine is coupled to modulate the threshold value signal to a first level in response to the present logic state of the feedback state signal being the second feedback state and a previous state of the feedback state signal having been the first feedback state, and wherein the state machine is coupled to modulate the threshold value signal to a second level in response to the present logic state of the feedback state signal being the first feedback state and the previous state of the feedback state signal having been the second feedback state.

19. The power supply regulation circuit of claim 18, wherein the first level is higher than the second level.

* * * * *